April 13, 1954     E. HERBERT     2,675,151
REVERSIBLE REAR WHEEL BICYCLE BASKET
Filed Oct. 27, 1949     3 Sheets-Sheet 1

INVENTOR.
Earl Herbert,
BY Victor J. Evans & Co.
ATTORNEYS

April 13, 1954   E. HERBERT   2,675,151
REVERSIBLE REAR WHEEL BICYCLE BASKET
Filed Oct. 27, 1949   3 Sheets-Sheet 2

INVENTOR.
Earl Herbert,
BY Victor J. Evans & Co.
ATTORNEYS

April 13, 1954     E. HERBERT     2,675,151
REVERSIBLE REAR WHEEL BICYCLE BASKET
Filed Oct. 27, 1949     3 Sheets-Sheet 3
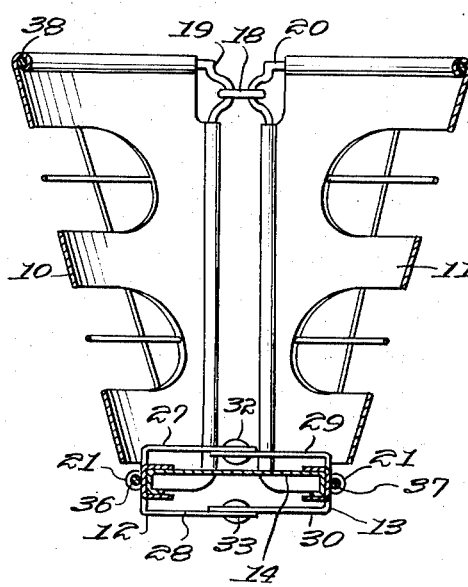
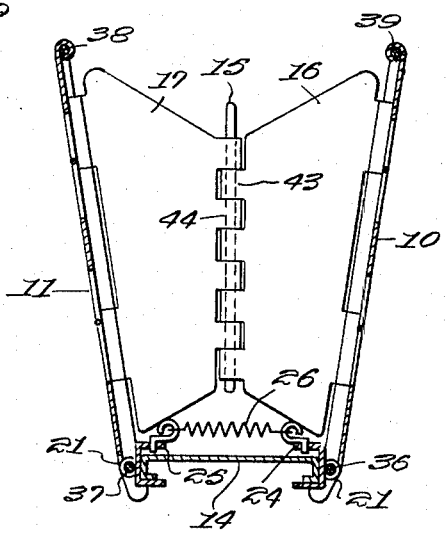
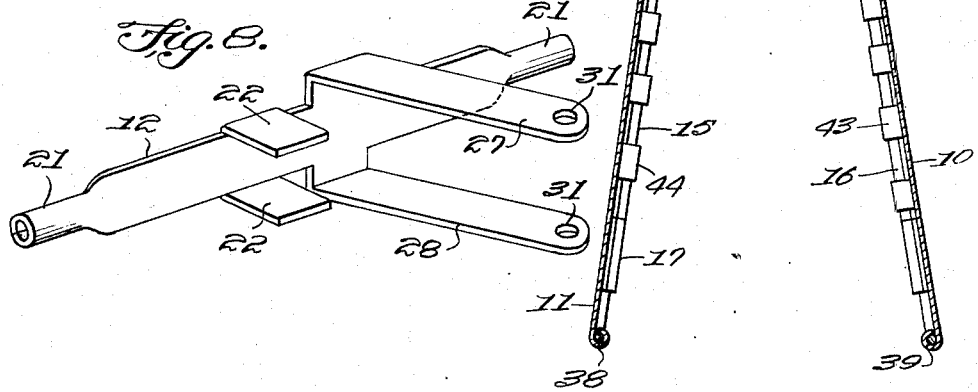
INVENTOR.
Earl Herbert,
BY Victor J. Evans & Co.
ATTORNEYS Patented Apr. 13, 1954

2,675,151

UNITED STATES PATENT OFFICE 2,675,151

REVERSIBLE REAR WHEEL BICYCLE BASKET

Earl Herbert, St. Joseph, Mo.

Application October 27, 1949, Serial No. 123,965

1 Claim. (Cl. 224—30)

This invention relates to luggage carriers and baskets for bicycles particularly of the two wheel type, and in particular the carrier includes a pair of outwardly bowed frames, means for pivotally attaching the frames to the sides of the horizontally disposed platform extended rearwardly from the saddle of a bicycle and positioned over the rear wheel, means for holding the ends of the frames together in upwardly extended positions for forming a basket and means securing the frames in downwardly extended positions on the sides of the rear wheel when the carrier is not in use.

The purpose of this invention is to provide a bicycle basket or carrier that remains in the upright position with the bicycle in the sloping position such as when the bicycle is supported by a kick stand and also to provide a carrier or basket that is adapted to be collapsed and folded to an inoperative position when not in use.

The usual type of bicycle basket carried by the handle bars or positioned over the front wheel of the vehicle is tilted toward one side when the front wheel is turned with the bicycle supported on a kick stand or the like so that parcels drop from the basket. It is also awkward, particularly for small children to carry large, bulky, or heavy packages on the handle bars of a bicycle. With this thought in mind this invention contemplates a basket or carrier positioned on the horizontal platform above the rear wheel and behind the saddle and formed with hinged sides that fold downwardly when not in use.

The object of this invention is, therefore, to provide a basket or carrier that is adapted to be used on the horizontally disposed platform extended rearwardly from a bicycle frame and positioned over the rear wheel.

Another object of the invention is to provide a bicycle basket or carrier of the collapsible type that may readily be attached to bicycles now in use.

A further object of the invention is to provide a collapsible basket or carrier adapted to be carried by the horizontally disposed platform extended from a bicycle frame which is of a simple and economical construction.

With these and other objects and advantages in view the invention embodies a pair of brackets positioned on the sides of a platform at the rear of bicycle, a pair of upwardly extended outwardly bowed frames pivotally attached to the bracket and means removably connecting the frames with the frames extended upwardly and also with the frames extended downwardly.

Other features and advantages of the invention will appear from the following description taken in connection with the drawings wherein:

Figure 5 is a cross section through the carrier looking toward the rear end thereof.

Figure 6 is a similar section looking toward the forward end thereof.

Figure 7 is a cross section similar to that shown in Figure 6 showing the sides of the carrier extended downwardly in the inoperative position.

Figure 8 is a detail illustrating one of the brackets for mounting the sides of the carrier on the platform of the bicycle.

Figure 1:
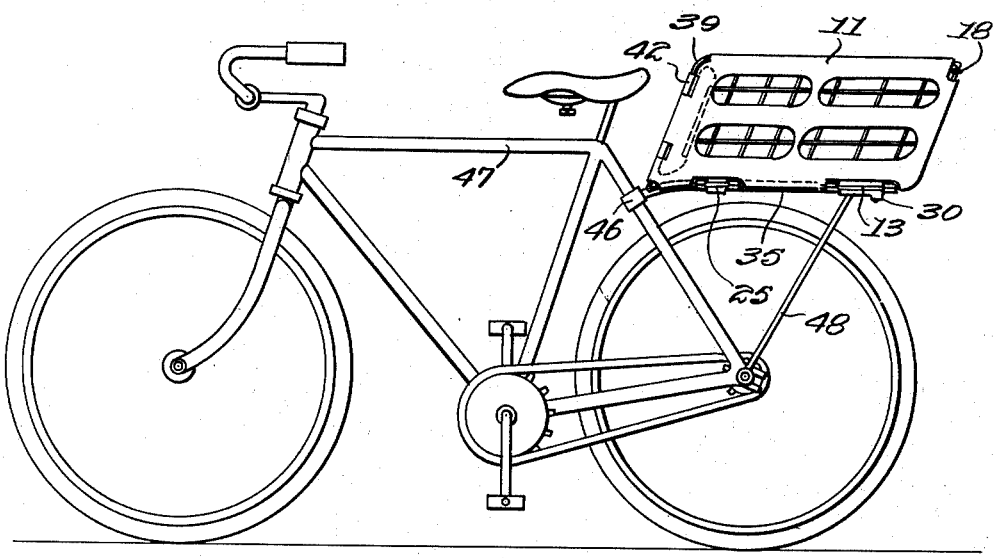
Figure 1 is a side elevational view illustrating the carrier mounted on the horizontally disposed platform extended from a bicycle frame and positioned over the rear wheel.
Figure 2:
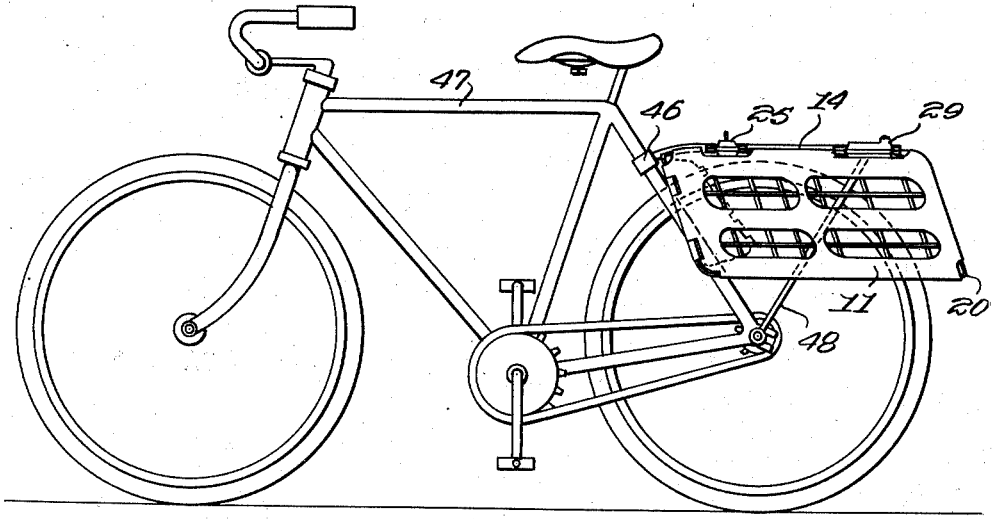
Figure 2 is a similar view showing the carrier collapsed with the sides extended downwardly and positioned on the sides of the rear wheel.

Referring now to the drawings wherein like reference characters denote corresponding parts the improved collapsible bicycle carrier of this invention includes frames 10 and 11 pivotally mounted on brackets 12 and 13, respectively, positioned over the platform 14 of a bicycle, a pin 15 pivotally connecting wings 16 and 17 at the forward ends of the frames and a split ring 18 detachably connecting the opposite ends of the frame through hooks 19 and 20 which are formed in wires 38 and 39 respectively.

The brackets 12 and 13 which are positioned over the edges of the platform 14 are provided with hubs 21, clips 22 and 23 that fit snugly over the sides of the platform, and extending fingers 27 and 28 on the bracket 12 and 29 and 30 on the bracket 13. The extended ends of the fingers 27, 28, 29 and 30 are provided with openings 31 by which the fingers are connected by pins or rivets 32 and 33. Clips 24 and 25 are provided at the forward end of the platform.

The lower edges of the frames 10 and 11 are rolled providing sleeves 34 and 35 through which the frames are pivotally connected to the brackets 12 and 13 by pins 36 and 37, respectively, which are journaled in the hubs 21 of the brackets.

The frames 10 and 11 are also provided with rolled edges on the upper sides, ends and corners and wires 38 and 39 extend through the rolled edges providing reinforcing means.

Figure 3:
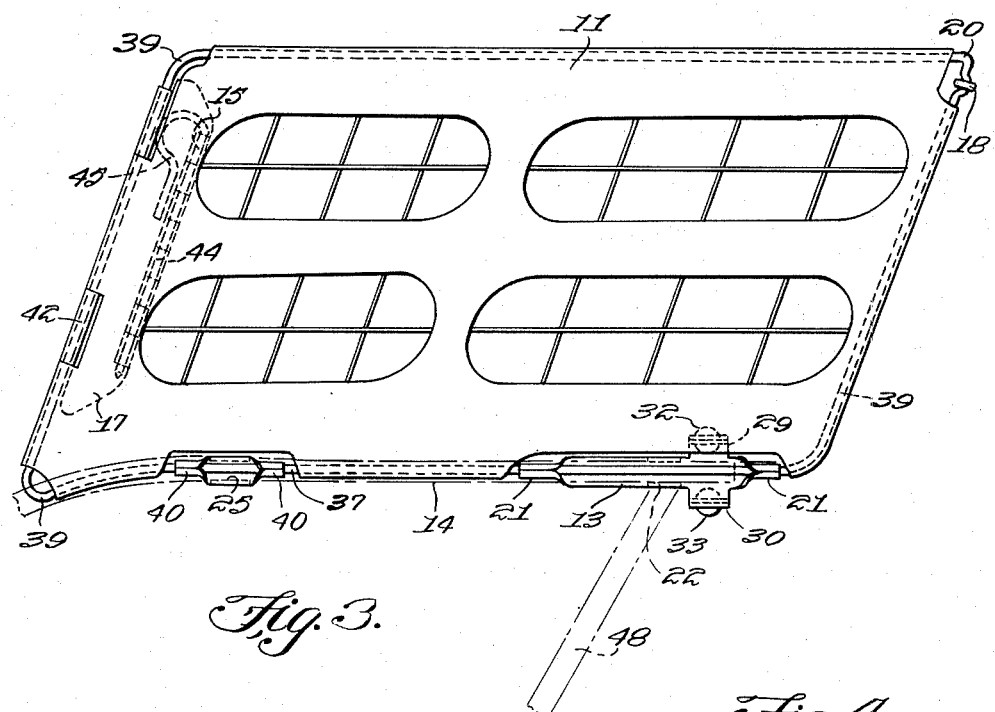
Figure 3 is a side elevational view similar to that shown in Figure 1 showing the carrier on an enlarged scale and illustrating the mounting elements thereof.
Figure 4:
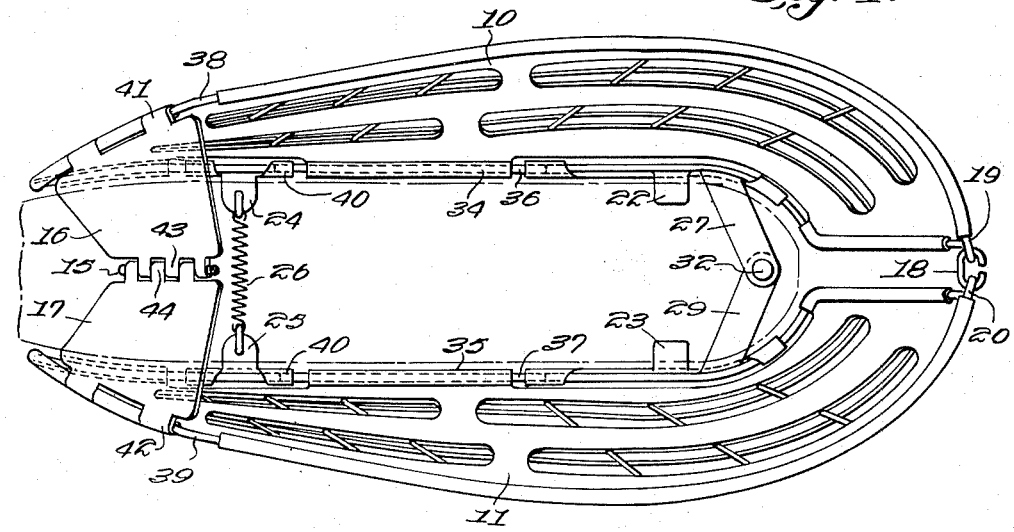
Figure 4 is a plan view of the carrier with other parts omitted and showing the carrier in the operative position.

The clips 24 and 25 in which the spring 26 is held are also provided with hubs 40 similar to the hubs 21 and the pins 36 and 37 extend through these hubs as shown in Figure 3.

The wings 16 and 17 are pivotally mounted through hubs 41 and 42, respectively on the wires 38 and 39 at the forward ends of the frames and the inner edges of the wings are provided with alternately spaced or interlocking hubs 43 and 44, respectively through which the pin 15 extends. The pin 15 is provided with a finger loop 45 at the upper end by which it may readily be removed and replaced.

The opposite or rear ends of the frames are detachably connected by the ring 18 in the offset sections of the hooks 19 and 20 and with one of the hooks withdrawn the ring 18 may be removed to separate the upper ends of the frames at the rear.

The platform 14 of the bicycle is provided with a hub 46 at the forward end by which it is attached to a frame 47 of a bicycle and the outer end is supported from the frame by a diagonal brace 48.

With the parts arranged in this manner the brackets 12 and 13 are mounted over the edges of the platform 14 and these are secured in position by the rivets 32 and 33. The clips 24 and 25 are held over the forward end of the platform by the spring 26. The frames 10 and 11 are pivotally mounted on the brackets and clips by the pins 36 and 37 and when the basket is positioned for use with the frames extended upwardly the pin 15 is extended through the hubs 43 and 44 of the wings 16 and 17 and the hooks 19 and 20 are extended through the ring 18. With the parts arranged in this manner the basket is adapted for use as a luggage carrier for holding packages and the like.

When it is not desired to use the basket or carrier the pin 15 is removed and one of the hooks is removed from the ring 18. The sides are then folded downward to the position shown in Figure 7 with the wings 16 and 17 folded against the inner surfaces of the sides. The sides may be secured in this position by tying the rear corners through the hooks 19 and 20.

It will be understood that modifications may be made in the design and arrangement of the parts without departing from the spirit of the invention.

What is claimed is:

A bicycle basket for use with a platform of a bicycle comprising a pair of side frames, a pair of brackets mounted on the opposite longitudinal sides of the platform, U-shaped clips on said brackets engaging the sides of the platform, inwardly extended fingers on each bracket in superposed relation to each other, means joining the abutting ends of the fingers in pivotal relation to each other, resilient means connecting certain of the U-shaped clips to retain the brackets on the platform, hubs formed on said brackets, means coacting with said hubs and said side frames for pivotally connecting the side frames to said platform, a wing pivotally connected to the front end of each side frame, a pin pivotally connecting the wings at their inner edges, and means connecting the rear ends of said side frames to retain the side frames in vertical relation to said platform.

References Cited in the file of this patent

UNITED STATES PATENTS

| Number | Name | Date |
| --- | --- | --- |
| 605,188 | Rondell | June 7, 1898 |
| 609,612 | Deveau | Aug. 23, 1898 |
| 947,886 | Copeland | Feb. 1, 1910 |
| 1,470,898 | Webb | Oct. 16, 1923 |
| 2,486,532 | Kubach | Nov. 1, 1949 |
| 2,498,663 | Easley | Feb. 28, 1950 |

FOREIGN PATENTS

| Number | Country | Date |
| --- | --- | --- |
| 421,585 | France | Dec. 27, 1910 |
| 341,309 | Great Britain | Jan. 15, 1931 |
| 867,354 | France | July 21, 1941 |